(12) United States Patent
Chang

(10) Patent No.: US 6,919,537 B2
(45) Date of Patent: Jul. 19, 2005

(54) ELECTRIC HEAT SEALER

(75) Inventor: Richard Chang, Hsi Chih (TW)

(73) Assignee: Welcome Co., Ltd., Hsi Chih (TW)

( * ) Notice: Subject to any disclaimer, the term of this patent is extended or adjusted under 35 U.S.C. 154(b) by 0 days.

(21) Appl. No.: 10/750,766

(22) Filed: Jan. 5, 2004

(65) Prior Publication Data

US 2004/0144766 A1 Jul. 29, 2004

(30) Foreign Application Priority Data

Jan. 24, 2003 (TW) ........................................ 92201380 U

(51) Int. Cl.$^7$ ................................................. H05B 1/00
(52) U.S. Cl. ..................... 219/243; 219/225; 219/246; 219/251; 219/236; 219/259; 219/255; 219/245
(58) Field of Search ................................ 219/225–229, 219/222, 246–247, 249–251, 236, 254–255, 259, 243, 245

(56) References Cited

U.S. PATENT DOCUMENTS 5,854,466 A * 12/1998 Chou ........................... 219/227
6,392,198 B1 * 5/2002 Yao ............................. 219/243

* cited by examiner

Primary Examiner—Shawntina Fuqua
(74) Attorney, Agent, or Firm—Bacon & Thomas

(57) ABSTRACT

An electric heat sealer is constructed to include two pivoted arms of substantially T-shaped profile and an electric heating mechanism in one of the arms, each arm having a handhold portion through which the user can hold the electric heat sealer with the left hand or the right hand as desired to directly seal the workpiece with the electric heat sealer, or to operate the electric heat sealer on a worktable when sealing the workpiece. An operation case is selectively used with the electric heat sealer for protection.

7 Claims, 6 Drawing Sheets

ELECTRIC HEAT SEALER

BACKGROUND OF THE INVENTION

1. Field of the Invention

The present invention relates to an electric heat sealing apparatus and, more particularly, to a handy electric heat sealer, which can be held in hand and operated to seal the workpiece, or placed on a work table when sealing the workpiece. The electric heat sealer enables the sealing operation to be done at a time.

2. Description of Related Art

Electric heat sealing apparatus are commonly used in shops and stalls to seal polybags or the like, keeping packed foods or articles from contamination.

However, regular electric heat sealing apparatus are commonly bulky and heavy, not practical for holding in hand when sealing the workpiece. When a conventional electric heat sealing apparatus is used, it must be placed on a worktable or the top of a desk or the like, and then press the movable arm to seal the workpiece. Further, when sealing the workpiece, for example, a polybag or the like with a conventional electric heat sealing apparatus, the hand holding the workpiece may hinder the sealing operation. Therefore, the user has to seal the workpiece from the middle area toward the two sides of the opening of the workpiece through several steps.

Various prior art designs of electric heat sealing apparatus are known. The inventor have also invented various designs of electric heat sealing apparatus, for example, the designs disclosed in Taiwan Patent Publication Nos. 370078; 370077; 356811; and etc.

SUMMARY OF THE INVENTION

The present invention has been accomplished under the circumstances in view. It is therefore the main object of the present invention to provide an electric heat sealer, which enables the user to hold the electric heat sealer in the left hand or right hand as desired and then to operate the electric heat sealer with the left or right hand, completing the sealing operation at one time. It is another object of the present invention to provide an electric heat sealer, which can be placed on a worktable and operated with one hand to seal the workpiece at one time. It is still another object of the present invention to provide an electric heat sealer, which is equipped with an operation case that assures safeness of the operation of the electric heat sealer, and causes a sense of beauty.

To achieve these and other objects of the present invention, the electric heat sealer is comprised of a first arm, an electric heating mechanism, and a second arm. The first arm has a coupling structure. The second arm has a coupling structure fastened pivotally with the coupling structure of the first arm for enabling the two arms to be turned relative to each other, and pressed together or moved apart. The first arm defines a receiving chamber, which accommodates the electric heating mechanism.

According to the present invention, the first arm and the second arm each have a handhold portion. When the two arms pivotally fastened together, the user can hold the handhold portions of the two arms to move the electric heat sealer, and to press the heating member of the electric heating mechanism against the workpiece been put on one arm, causing the workpiece to be sealed.

Further, the first arm is a substantially T-shaped member having a left end portion and a right end portion aligned in a line. The combined length of the left end portion and right end portion of the first arm is within six to ten centimeters, or preferably at eight centimeters. The second arm is a substantially T-shaped member having a left end portion and a right end portion aligned in a line corresponding to the left end portion and right end portion of the first arm. The combined length of the left end portion and right end portion of the second arm is within six to ten centimeters, or preferably at eight centimeters. By means of the design of the left and right end portions at each arm, the user can hold the electric heat sealer with the left hand or the right hand as desired, and then operate the electric heat sealer with the left or right hand to seal the workpiece. Because the two arms are respectively shaped like a T-bar, the left or right end portions of the arms are extended to one lateral side of the workpiece, i.e. the heating member of the electric heating mechanism can be directly extended to one lateral side of the workpiece, enabling the user to seal the workpiece at one time.

Further, the first arm and second arm can be directly placed on a worktable when sealing the workpiece, i.e., the electric heat sealer can be used as a palmtop electric heat sealer as well as a table electric heat sealer.

The invention further comprises an operation case. The operation case comprises a case body, a receiving chamber, and an opening. Through the opening, the handhold portions of the two arms can be inserted into the inside of the receiving chamber of the operation case. The operation case gives a protection to the user's hand during operation. The operation case can be made having any of a variety of ornamental design that causes a sense of beauty. After the electric heat sealer has been received in the operation case, the operation case can be conveniently placed on a worktable for pressing by hand to force the electric heat sealer to seal the workpiece.

The electric heat sealer can be used with battery. Alternatively, a power adapter may be installed in the electric heat sealer, enabling the electric heat sealer to obtain the necessary working voltage from an external power source. The position of the heating member of the electric heating mechanism is not limited to the first arm. Alternatively, the heating member of the electric heating mechanism can be installed in the second arm. If desired, two heating members may be used and respectively installed in the two arms.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
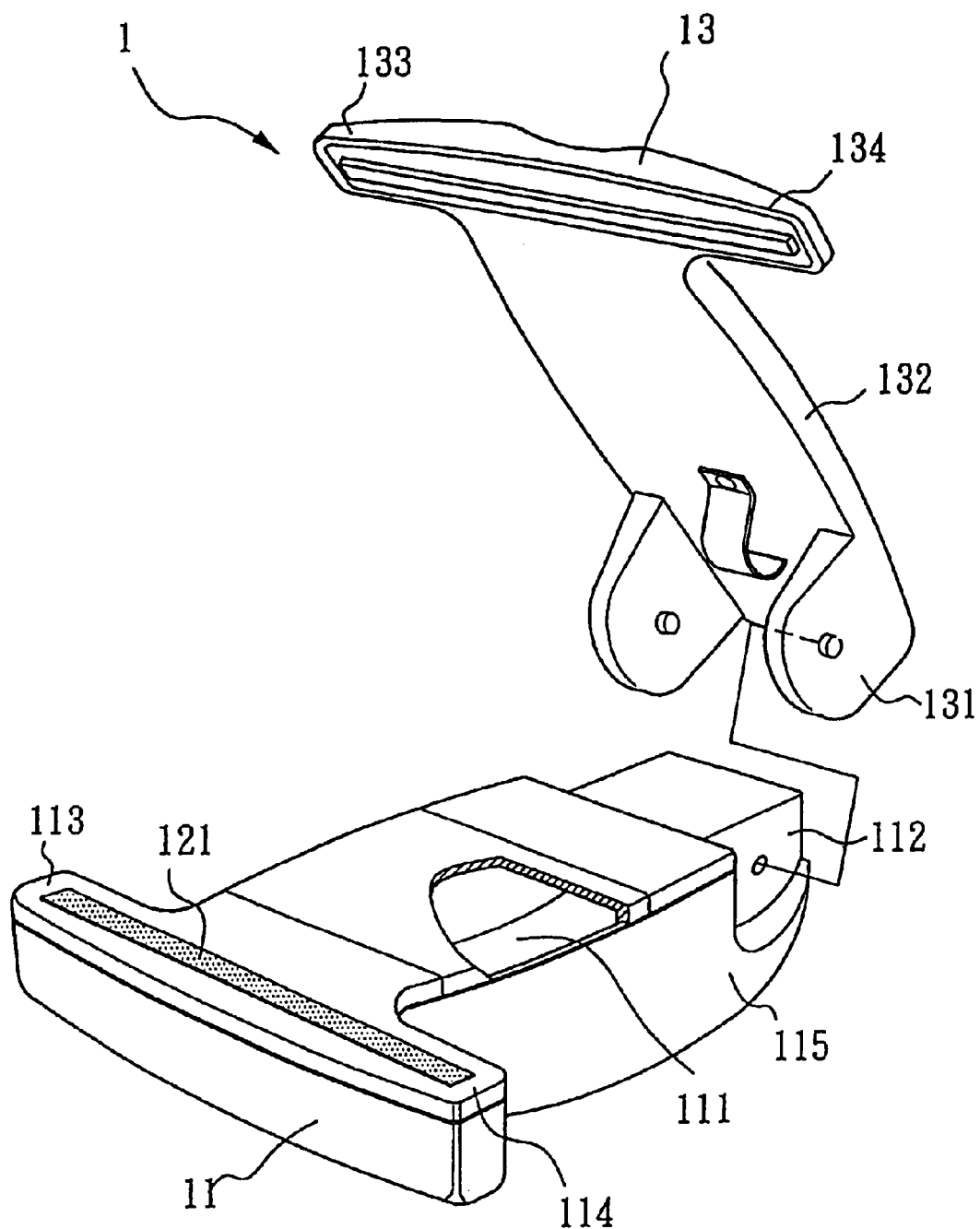
FIG. 1 is an exploded view of an electric heat sealer according to the present invention.

FIG. 1 is an exploded view of an electric heat sealer constructed according to the present invention. As illustrated, the electric heat sealer, referenced by 1, is comprised of a first arm 11 and a second arm 13. According to this embodiment, the first arm 11 and the second arm 13 have a substantially T-shaped profile. The first arm 11 has a left end portion 113 and a right end portion 114 aligned in a line. The second arm 13 has a left end portion 133 and a right end portion 134 aligned in a line corresponding to the left end portion 113 and right end portion 114 of the first arm 11. The combined length of the left end portion 113 and right end portion 114 of the first arm 11 is eight centimeters. The combined length of the left end portion 133 and right end portion 134 of the second arm 13 is also eight centimeters. This eight centimeters design is simply an example. In actual practice, the combined length can be set within six to ten centimeters. Further, the first arm 11 has a handhold portion 115. The second arm 13 also has a handhold portion 132. The handhold portion 115 of the first arm 1 defines a receiving chamber 111, which accommodates an electric heating mechanism (not shown). Because the electric heating mechanism is similar to the electric heating mechanisms used in conventional electric heat sealers, no further detailed description in this regard is necessary.

As shown in FIG. 1, the first arm 11 has a coupling structure 112 disposed at one end remote from the left end portion 113 and the right end portion 114. The second arm 13 has a coupling structure 131 disposed at one end remote from the left end portion 133 and the right end portion 134. The coupling structures 112 and 131 are fastened pivotally together such that the first arm 11 and the second arm 13 can be turned relative to each other and pressed against each other, or moved apart. According to this embodiment, the coupling structures 112 and 131 are respectively comprised of recessed holes and protruding stub rods. Alternatively a pivot pin can be used to pivotally secure the first arm 11 and the second arm 13 together.

Figure 2:
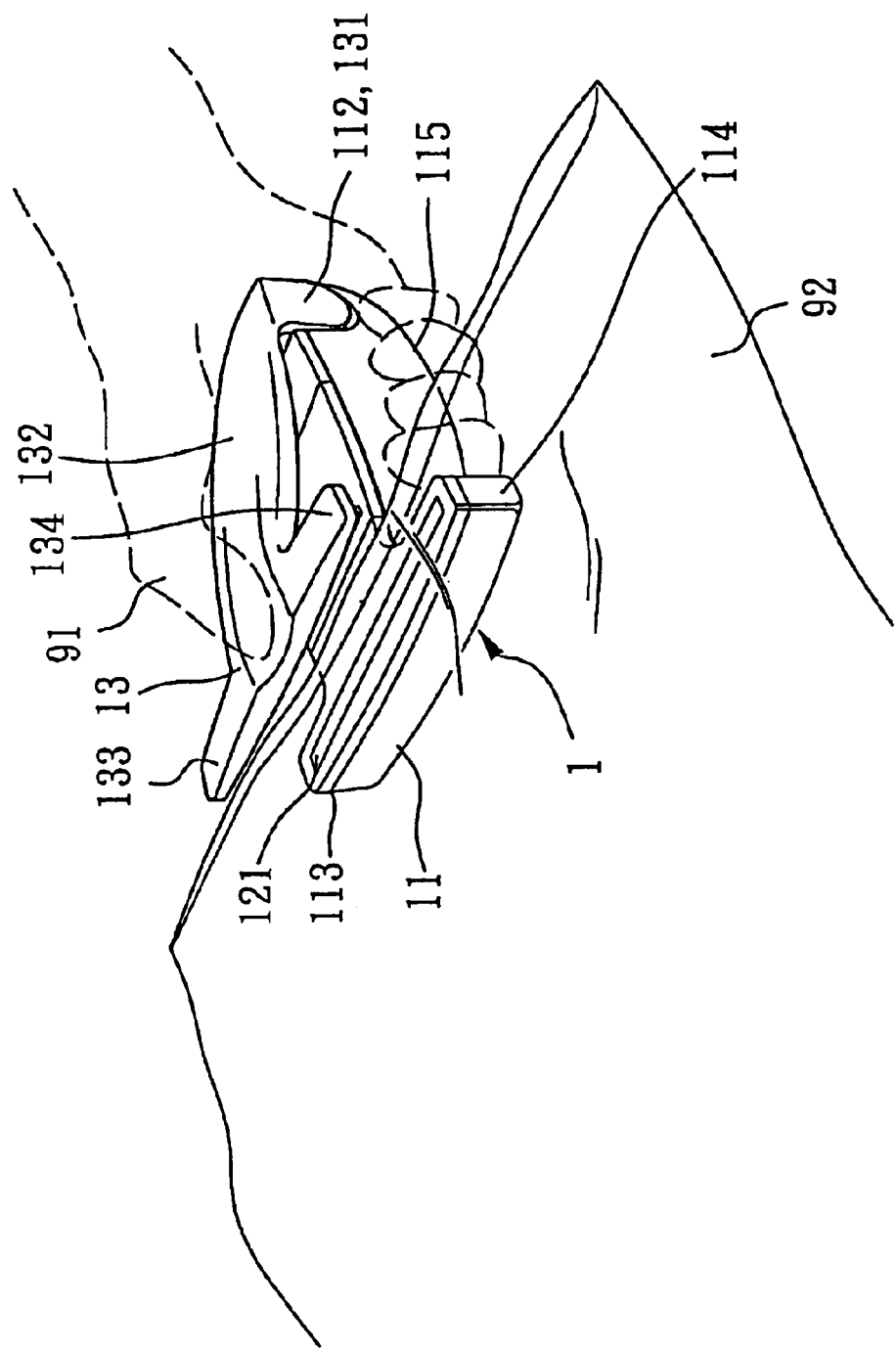
FIG. 2 is a schematic drawing showing one application example of the electric heat sealer according to the present invention where the user operates the electric heat sealer with the right hand.

Referring to FIG. 2, after the first arm 11 and the second arm 13 have been pivotally coupled together, the user can hold the handhold portion 115 of the first arm 11 and the handhold portion 132 of the second arm 13 with the right hand 91 to move the electric heat sealer 1, and then force the first arm 11 and the second arm 13 toward each other, causing the heating member 121 of the electric heat mechanism in the first arm 11 to press and heat the workpiece 92 against the second arm 13. Therefore, the workpiece 92 is sealed. The workpiece 92 indicated in this and the following other embodiments of the present invention are a polybag.

Figure 3:
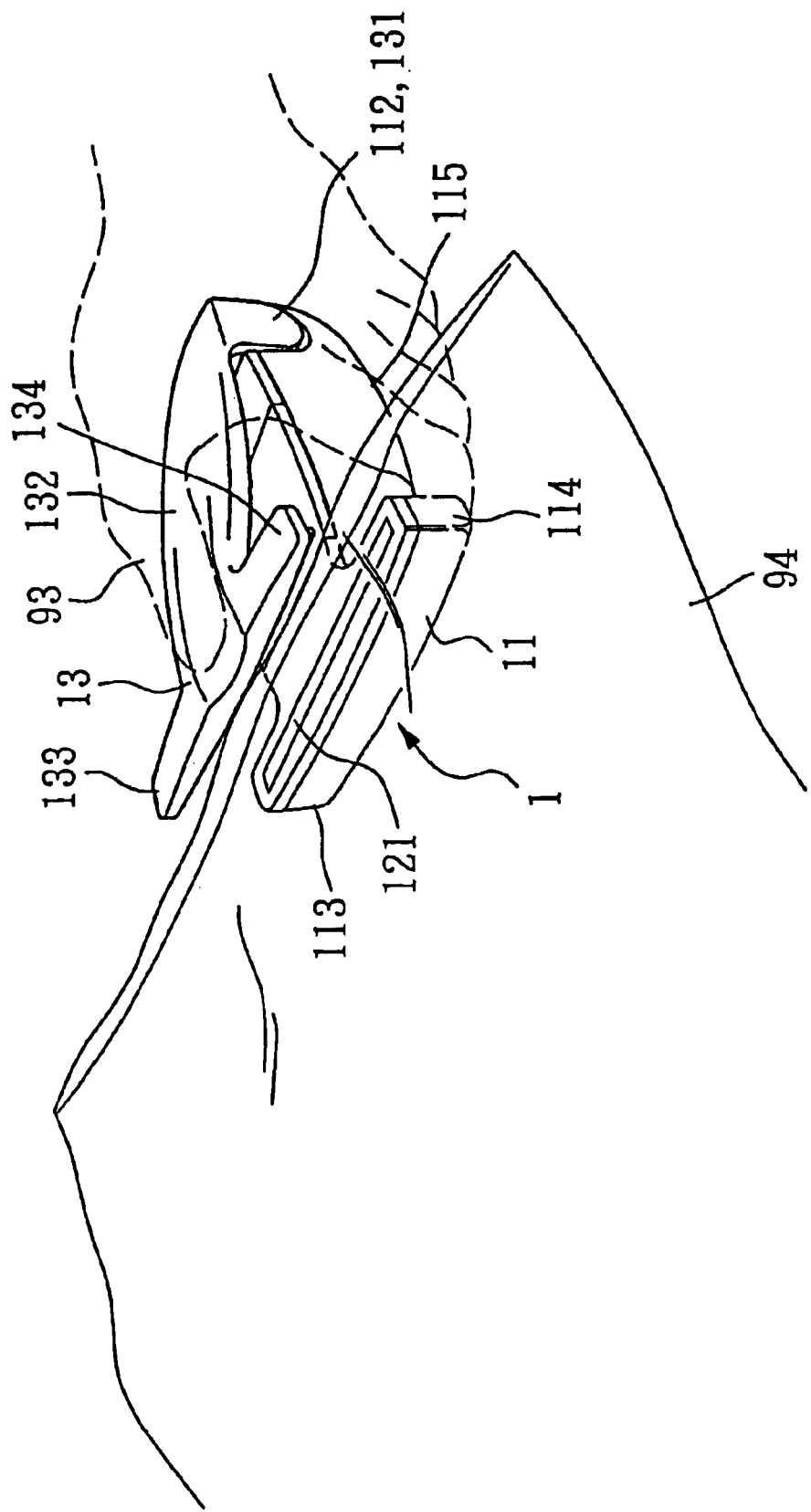
FIG. 3 is a schematic drawing showing another application example of the electric heat sealer according to the present invention where the user operates the electric heat sealer with the left hand.

FIG. 3 is a schematic drawing showing application example of the electric heat sealer 1 according to the present invention. As illustrated, the user holds the electric heat sealer 1 with the right hand 93 to seal the workpiece 94. As illustrated in FIGS. 2 and 3, the design of the left end portions 113 and 133 and right end portions 114 and 134 of the first and second arms 11 and 13 enables the user to hold the electric heat sealer 1 directly with the right hand or left hand and to further seal the workpiece. Further, the design of the left end portions 113 and 133 and right end portions 114 and 134 of the first and second arms 11 and 13 enables the left end portions 113 and 133 or right end portions 114 and 134 to be extended to one lateral side of the workpiece 92 or 94 during sealing operation, so that the user can complete the sealing operation at one time.

Figure 4:
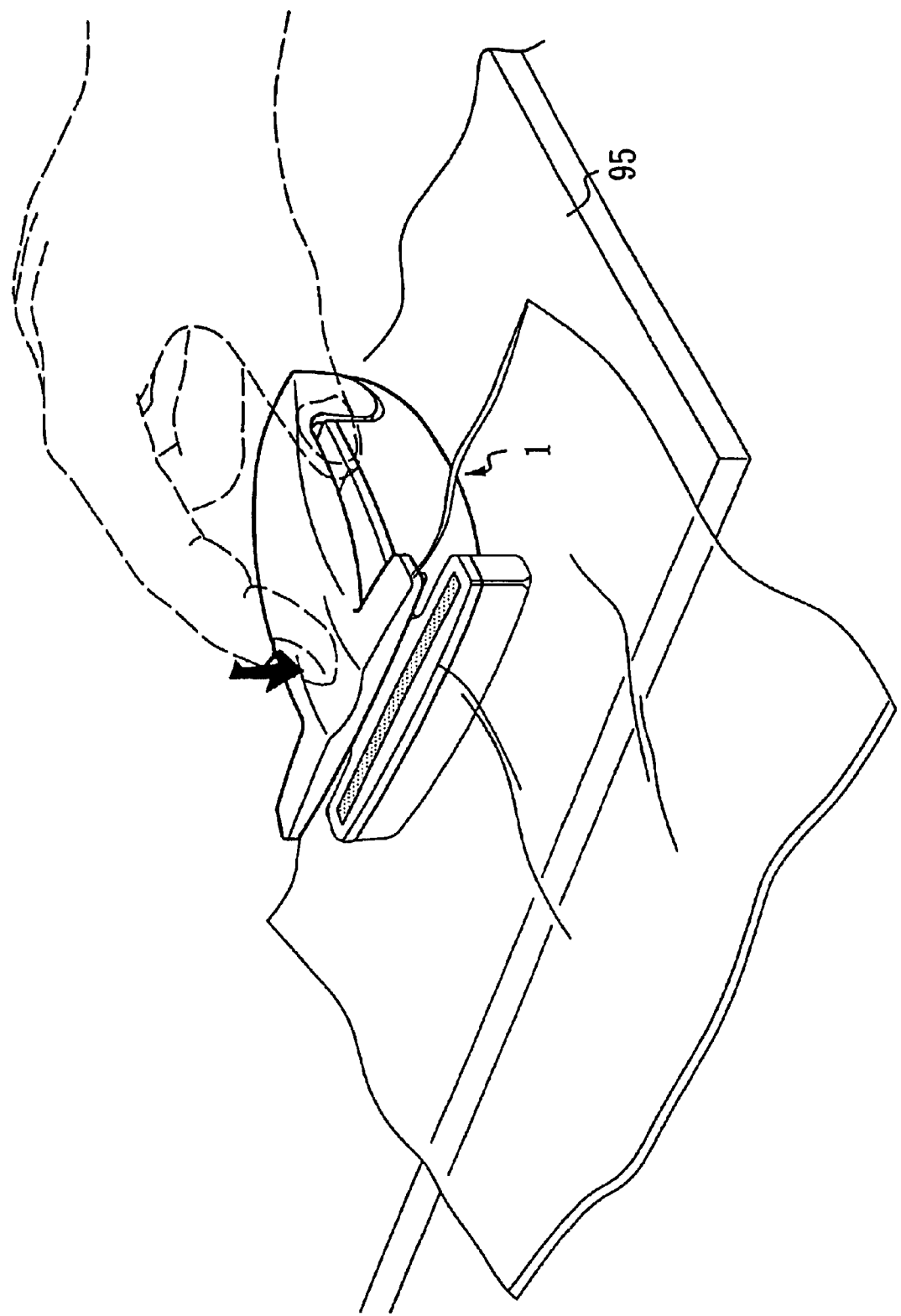
FIG. 4 is a schematic drawing showing still another application example of the electric heat sealer according to the present invention where the electric heat sealer is operated by the user on a worktable.

FIG. 4 is a schematic drawing showing still another application example of the electric heat sealer 1. As illustrated, the electric heat sealer 1 is directly put on a worktable 95, working as a desktop electric heat sealer 1.

Figure 5:
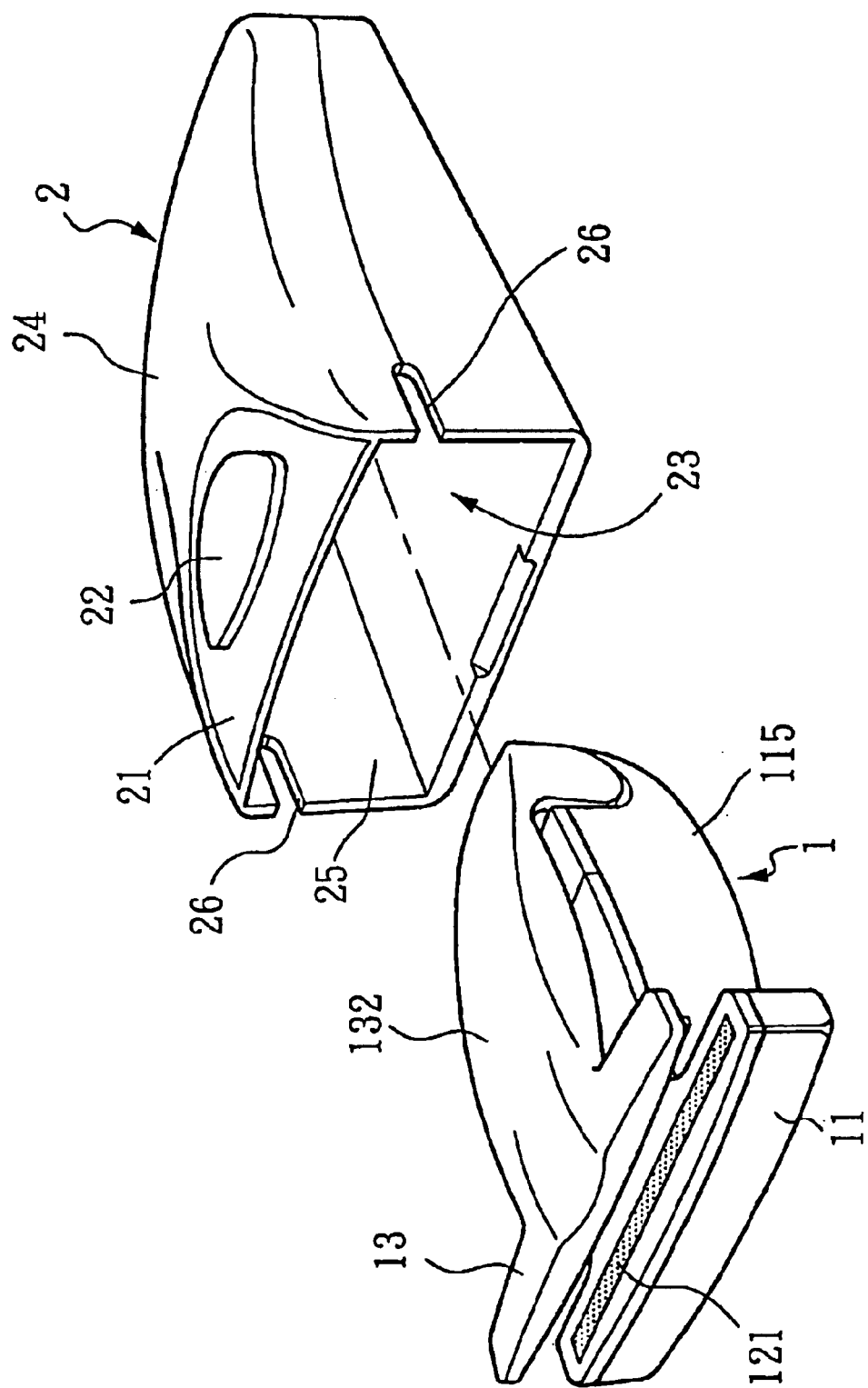
FIG. 5 is an exploded view of the electric heat sealer and an operation case according to the present invention.
Figure 6:
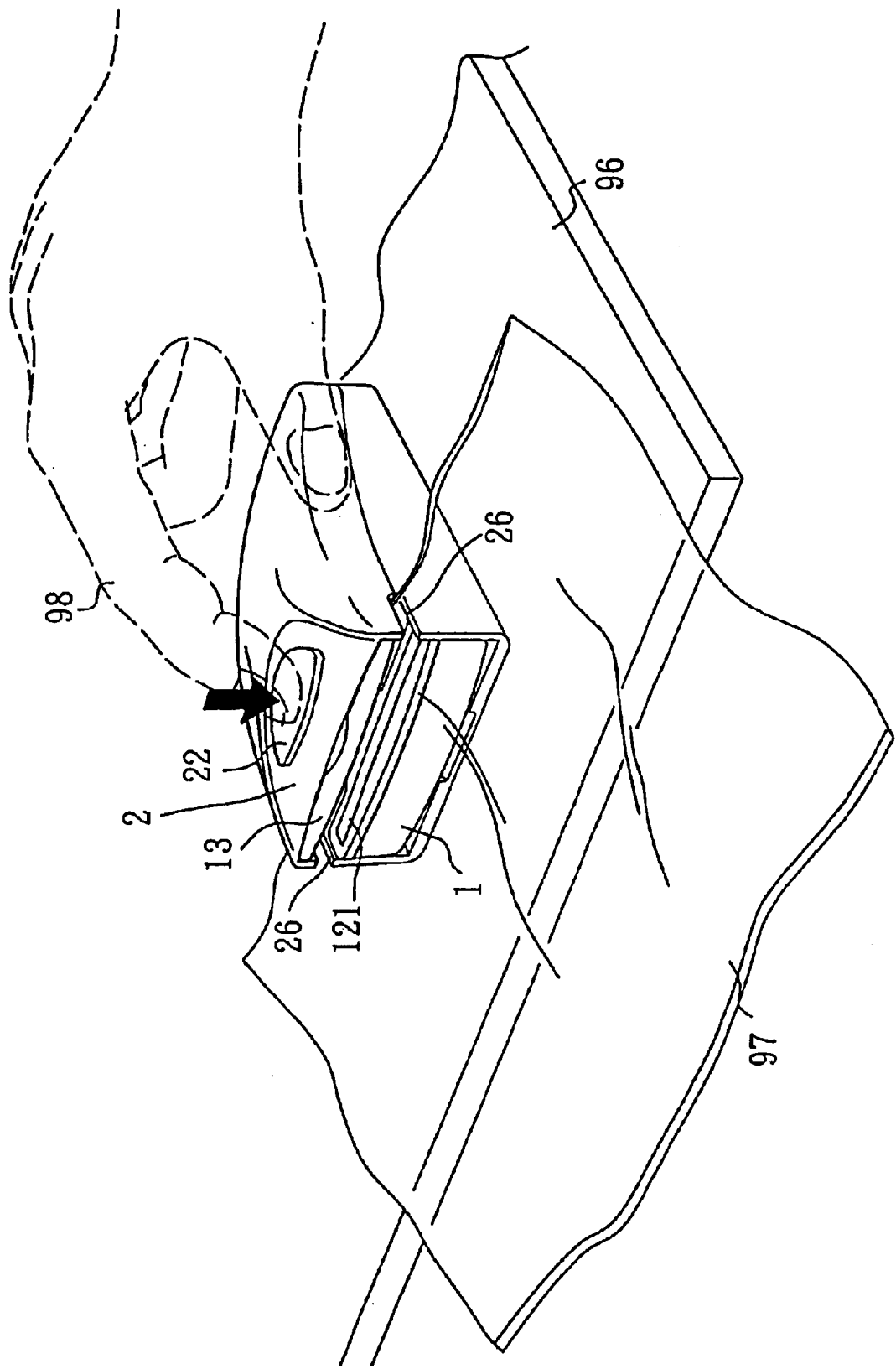
FIG. 6 is a schematic drawing showing an application example of the electric heat sealer with the operation case according to the present invention.

Referring to FIGS. 5 and 6, the electric heat sealer 1 can be used with an operation case 2. When assembled, the electric heat sealer 1 can be put into the inside of the operation case 2. The operation case 2 comprises a case body 24, a receiving chamber 23, and an opening 25. The handhold portion 115 of the first arm 11 and the handhold portion 132 of the second arm 13 can be freely inserted through the opening 25 into the inside of the receiving chamber 23. Further, the case 2 has a top face 21 and an operation portion 22 at the top face 21 corresponding to the second arm 13. The operation portion 22 is supported on a spring member (not shown) in the operation case 2. The spring member can be a plastic spring plate, metal spring leaf, or compression spring. As shown in FIG. 6, after the electric heat sealer 1 had been received inside the operation case 2, the operation case 2 is put on a worktable 96 or the top of a table or the like, and the user can then press the operation portion 22 of the operation case 2 with the finger 98 to force the second arm 13 downwards against the workpiece 97 at the first arm 11 and to further seal the workpiece 97. During sealing operation, the user can pull the workpiece 97 leftwards or rightwards to adjust the position of the workpiece 97 in the electric heat sealer 1. Further, the operation case 2 has two notches 26 at two sides of the opening 25 corresponding to the heating member 121 of the electric heat sealer 1 for guiding movement of the workpiece 97 during heat sealing operation. Therefore, by means of the operation case 2, the electric heat sealer 1 can be put on the worktable 96 and operated to seal the workpiece 97. Further, the operation case 2 protects the user's hand during heat sealing operation. The operation case 2 can be made having any of a variety of decorative design that causes a sense of beauty.

A prototype of electric heat sealer has been constructed with the features of FIGS. 1~6. The electric heat sealer functions smoothly to provide all of the features discussed earlier.

Although particular embodiments of the present invention have been described in detail for purposes of illustration, various modifications and enhancements may be made without departing from the scope of the invention. Accordingly, the invention is not to be limited except as by the appended claims.

What is claimed is:

1. An electric heat sealer comprising
   a first arm, said first arm having a T-shaped profile, a left end portion and a right end portion aligned in a line, a handhold portion, a receiving chamber defined within said handhold portion, and a coupling structure located on one end of said handhold portion remote from the left end portion and right end portion of said first arm;
   an electric heating mechanism installed in said receiving chamber inside said first arm, said electric heating mechanism comprising a heating member; and
   a second arm, said second arm having a T-shaped profile, a left end portion and a right end portion aligned in a line corresponding to the left end portion and right end portion of said first arm, a handhold portion, and a coupling structure located on one end of the handhold portion of said second arm remote from the left end portion and right end portion of said second arm and pivotally coupled to the coupling structure of said first arm for enabling the user to hold the handhold portions of said first arm and said second arm and to move said first arm and said second arm relative to each other to further force said heating member of said electric heating mechanism against the workpiece being put in between said first arm and said second arm, and further comprising an operation case, said operation case having a receiving chamber adapted to receive said first arm and said second arm, and an opening through which the handhold portions of said first arm and said second arm are insertable into the receiving chamber of said operation case.

2. The electric heat sealer as claimed in claim 1, wherein said operation case has a top side corresponding to said second arm, and an operation portion disposed at said top side for pressing by the user to force said second arm toward said first arm.

3. The electric heat sealer as claimed in claim 1, wherein said operation case has six sides.

4. The electric heat sealer as claimed in claim 1, wherein said operation case has at least one notch corresponding to the heating member of said electric heating mechanism.

5. The electric heat sealer as claimed in claim 1, wherein the combined length of the left end portion and right end portion of said first arm is within six to ten centimeters.

6. The electric heat sealer as claimed in claim 1, wherein the combined length of the left end portion and right end portion of said second arm is within six to ten centimeters.

7. The electric heat sealer as claimed in claim 1, wherein the coupling structure of said first arm is comprised of at least one male pivot means, and the coupling structure of said second arm is comprised of at least one female pivot means adapted to accommodate the male pivot means of the coupling structure of said first arm.

* * * * *